United States Patent [19]

Hill et al.

[11] 3,795,772

[45] Mar. 5, 1974

[54] SYNCHRONIZATION SYSTEM FOR PULSE ORTHOGONAL MULTIPLEXING SYSTEMS

[75] Inventors: Eugene R. Hill, Thousand Oaks; Harlan H. Mansnerus, Newbury Park, both of Calif.

[73] Assignee: The United States of America as represented by the Secretary of the Navy, Washington, D.C.

[22] Filed: May 1, 1972

[21] Appl. No.: 249,337

[52] U.S. Cl. .......................... 179/15 BS, 179/15 BC

[51] Int. Cl. .......................................... H04j 7/00

[58] Field of Search... 179/15 BC, 15 BS; 178/69.5 R; 329/122, 123, 50; 328/133

[56] References Cited

UNITED STATES PATENTS

| | | | |
|---|---|---|---|
| 3,703,686 | 11/1972 | Hekimian | 328/133 |
| 3,578,956 | 5/1971 | McCall | 178/69.5 R |
| 3,585,298 | 6/1971 | Liberman | 178/69.5 R |
| 3,691,474 | 9/1972 | Calaway | 328/133 |
| 3,421,105 | 1/1969 | Taylor | 331/4 |
| 3,032,720 | 5/1962 | Bruch | 331/11 |
| 3,204,034 | 8/1965 | Ballard | 179/15 BC |

*Primary Examiner*—Kathleen H. Claffy
*Assistant Examiner*—David L. Stewart
*Attorney, Agent, or Firm*—Richard S. Sciascia; Joseph M. St. Amand

[57] ABSTRACT

A synchronization system having a plurality of control loops operative together to optimize the rate of frequency acquisition and synchronization. A first loop acquires the frequency of the unknown signal. A coarse phase-lock loop then adjusts the system to provide a phase-error signal. A fine phase-lock loop then makes the final adjustments to the system. As each step in the synchronization sequence is achieved, the circuitry which is no longer needed is switched out of operation.

3 Claims, 3 Drawing Figures

SYNCHRONIZATION SYSTEM FOR PULSE ORTHOGONAL MULTIPLEXING SYSTEMS

BACKGROUND OF THE INVENTION

This invention relates to multiplexing systems and particularly to a circuit for synchronizing the demultiplexer of a pulse orthogonal multiplexing (POM) system in both frequency and phase with respect to the received signal.

Prior methods available for such synchronization have several disadvantages: The frequency acquisition range is very small; i.e., less than 1 percent of the highest frequency subcarrier; the time required to obtain the proper course phase condition is very long because of the need to sequentially step the fine phase-lock-loop cycle by cycle until the proper course phase is achieved, and since this condition is sensed by a peak correlation detector, it is dependent upon the simultaneous operation of an automatic calibration control; and, since the calibration voltage is obtained by detection of the highest frequency subcarrier, such reference voltage becomes a sensitive function of phase error and the characteristics of the video filter.

SUMMARY OF THE INVENTION

The improved synchronization circuit of this invention employs a multiple control loop which provides near optimum control during each phase of synchronization acquisition. The system acquires the received frequency rapidly over a wide bandwidth of ±10 percent or more of the nominal center frequency, and this performance is affected very little by the presence of noise (down to $(S/N)_{IF}$ of −1.5 dB or below). The frequency acquisition circuit (after frequency is acquired) provides a phase error signal which initially aids course phase-lock acquisition. A course phase-lock loop adjusts to the proper phase for the fine phase-lock loop and is dominant during this phase of operation. Thus, the time to acquire the proper fine phase condition is reduced. A step-and-compare procedure for proper fine phase determination is unnecessary. As each step in the synchronization sequence is achieved the circuitry which is no longer needed is switched out of operation. Thus, the resolution is improved as the final desired state of synchronization is approached.

The lowest frequency sub-subcarrier is used for the three functions of: Calibration, course phase-lock, and frequency acquisition. A set-reset flip-flop is used following a band pass filter and zero-crossing detector to obtain an error signal for frequency acquisition and initial phase lock. This combination has the ability to perform exceptionally well at low S/N. The error signals for frequency acquisition, course phase-lock and fine phase-lock are combined simultaneously in a single active loop-filter for control of a single voltage controlled oscillator. Continuous monitoring of the synchronization status and automatic exclusion or inclusion of error signals is done in a manner to optimize the synchronization performance. Also, a dual time constant is used to enhance the probability of in-synchronization detection over false-alarm occurrence.

DESCRIPTION OF THE PREFERRED EMBODIMENT

Figure 1:
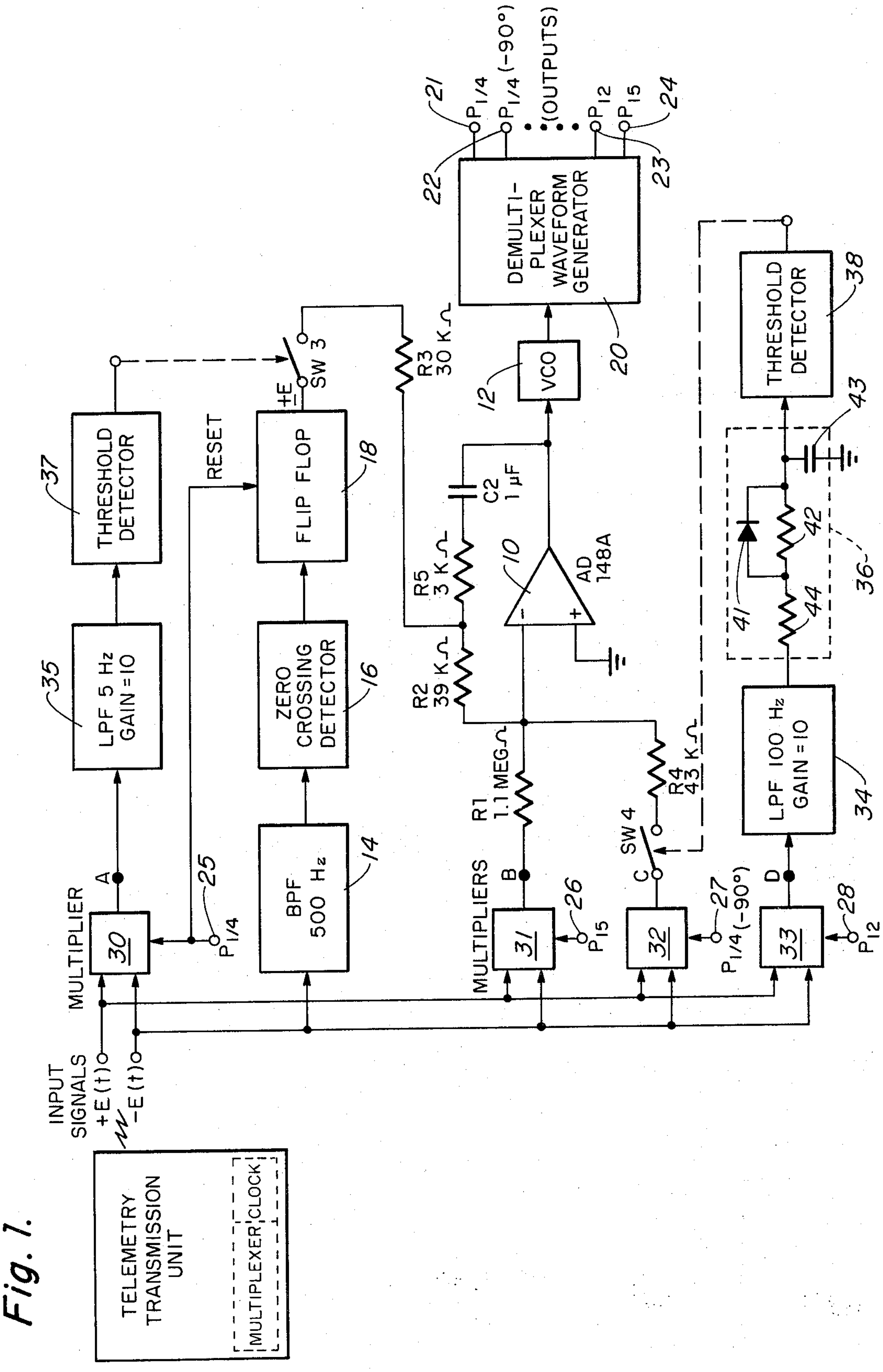
FIG. 1 is a diagrammatic circuit diagram of a preferred embodiment of the synchronization system of this invention.

The synchronization system of this invention, shown in FIG. 1, involves four regions of operation: (1) frequency acquisition, (2) initial phase-lock, (3) coarse phase-lock, and (4) fine phase-lock. The synchronization system herein described is primarily applicable for use with pulse orthogonal multiplexing (POM) systems.

The technique of orthogonal multiplexing, or pulse orthogonal multiplexing, allows for optimum detection of signals in Gaussian noise. As the name indicates, the POM system is based on the principle of orthogonality, a tool which is used in many branches of mathematics and which may be defined as follows. Given two functions $P_n(t)$ and $P_m(t)$ which are defined over some interval of time T, it follows that the two functions are orthogonal over that interval if $$\int_0^T P_n(t)P_m(t)dt = \begin{cases} 0 \text{ if } m \neq n \\ r \text{ if } m = n \end{cases}$$

where $r$ = constant. If $r = 1$, *then* $P_n(t)$ and $P_m(t)$ are orthonormal. That is to say, when orthogonal functions are multiplied together and integrated over the required interval, the result is zero. A non-zero value results only when an orthogonal function is multiplied by itself and the product is integrated over the interval of orthogonality.

Figure 2:
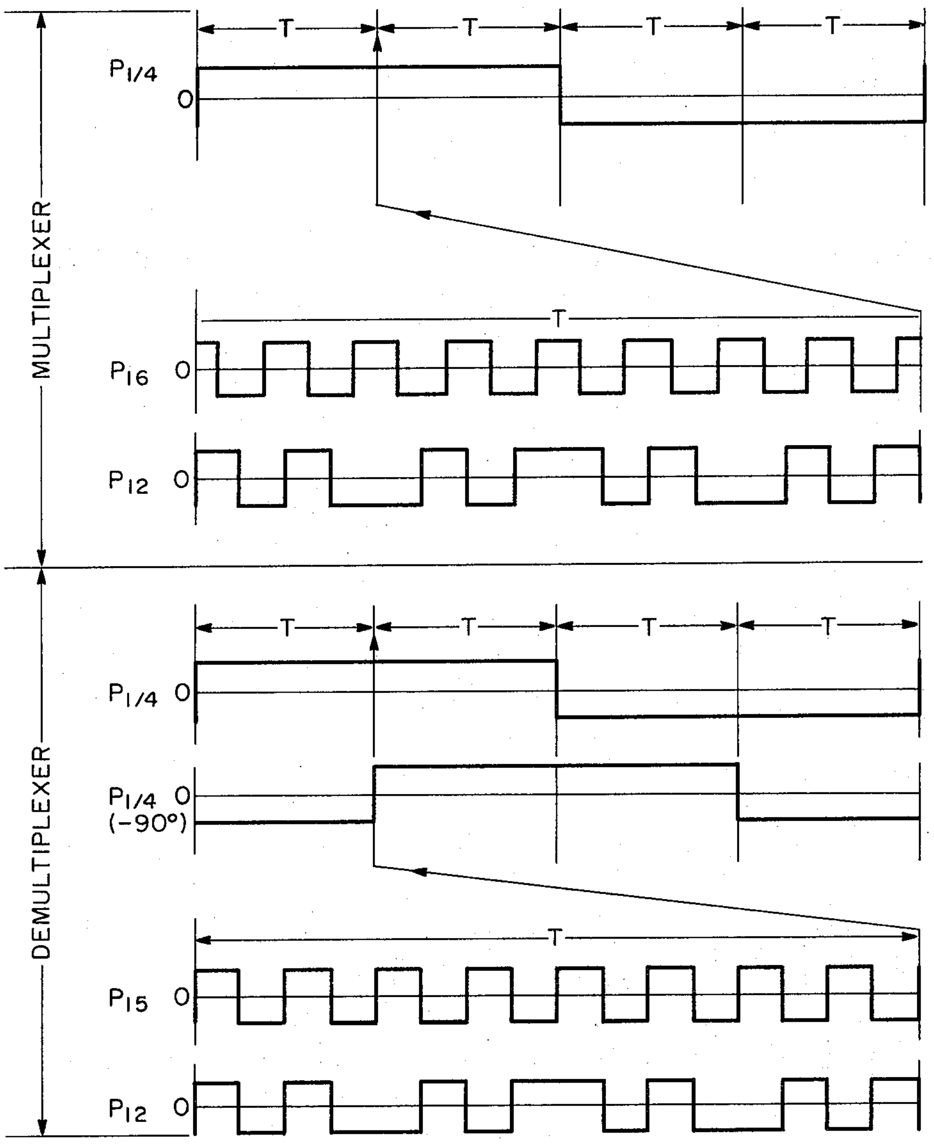
FIG. 2 illustrates the synchronization waveforms used in circuit of FIG. 1.

The subcarrier data waveforms generated in the multiplexer and demultiplexer are identical with the exception of the synchronization waveforms that are used for phase locking the two generators. These consist of waveforms $P_{1/4}$ and $P_{16}$ in the telemetry unit multiplexer and waveforms $P_{1/4}$ (−90°) and $P_{15}$ in the demultiplexer. All four are square waves as shown in FIG. 2; the two in the demultiplexer are shifted 90° with respect to the two in the multiplexer. In addition to the sample-and-hold pulses, integrator reset pulses are required in the demultiplexer.

Three subcarrier waveforms are transmitted full scale with the multiplexer composite signal from the airborne or remote telemetry transmission unit for synchronization and calibration purposes. The lowest and highest square wave subcarriers are used for coarse and fine synchronization. A subcarrier waveform $P_{16}$ as shown in FIG. 2, is transmitted for fine synchronization information. The lowest frequency square wave is generated with a period equal to that of the lowest frequency sub-subcarriers. In the present system, this period is 4T, and the lowest frequency square wave is thus waveform $P_{1/4}$ (see FIG. 2). Complete synchronization and calibration of the system can be achieved with these two waveforms; however, waveform $P_{12}$ is also transmitted for increased speed of fine synchronization acquisition. The circuit diagram of FIG. 1 shows the synchronization portion of a demultiplexer. The values assigned to some of the components are given by way of example. The synchronization system of FIG. 1 and its operation are hereinafter described.

During frequency acquisition, switches SW3 and SW4 are closed, and a current proportional to the frequency error is fed to the error amplifier 10 through resistor R3. When the phase error is reduced below 45° of waveform $P_{1/4}$, switch SW3 opens and the system goes to coarse phase lock. When the phase error is reduced below about ±45° of waveform $P_{16}$, switch SW4 opens and fine phase lock is achieved.

The system involves all three feedback loops in a second order, type one control system. A single voltage controlled oscillator (VCO) 12 in the demultiplexer is controlled in frequency and phase. The purpose of VCO 12 is to provide a reference frequency which is to be phase locked to the clock in the multiplexer.

FREQUENCY ACQUISITION

The POM system offers a unique opportunity for a high-performance frequency acquisition system. As shown in FIG. 1, the components involved in frequency acquisition are a band pass filter (BPF) 14, a zero crossing detector 16, and a set-reset flip-flop circuit 18. The BPF 14 center frequency is set at 500 Hz, which is the fundamental of waveform $P_{1/4}$. BPF 14 rejects most of the input noise spectrum and the spectral components of the other subcarrier waveforms. The filter 14 output is a 500-Hz sine wave relatively free of noise. The voltage levels at the output of flip-flop 18 are ±E. The flip-flop 18 is set to +E by incoming waveform $P_{1/4}$ from the telemetry unit multiplexer and reset to −E by the locally generated waveform $P_{1/4}$ from the demultiplexer waveform generator 20. When the locally generated, demultiplexer $P_{1/4}$ frequency is below the received (multiplexer) $P_{1/4}$ frequency, the average voltage from flip-flop circuit 18 will be positive; and when the demultiplexer $P_{1/4}$ frequency from generator 20 is greater than the received multiplexer $P_{1/4}$ frequency, the average voltage from the flip flop will be negative. This provides the necessary error signal to permit VCO 12 to be pulled to the correct frequency for phase lock with the clock in the multiplexer. The average voltage at the flip-flop output is given by $$V = \begin{cases} E\left(1-\frac{f}{f_c}\right) f \leq f_c \\ -E\left(1-\frac{f_c}{f}\right) f > f_c \end{cases} \quad (2)$$

where $E$ = voltage level (plus and minus) at output of flip-flop $f$ = VCO frequency in demultiplexer $f_c$ = multiplexer clock frequency Note that V is a linear function of $f$ for $f \leq f_c$ and a nonlinear function of $f$ for $f > f_c$. This nonlinearity, however, is small for $f$ near $f_c$.

For an initial frequency error of $\Delta f$ between the clock in the multiplexer and the VCO 12 in the demultiplexer, the acquisition time can be determined from an analysis of the control loop. The frequency error at any time after the beginning of frequency acquisition is $$f_\epsilon(\tau) = \Delta f\left( e - \frac{K_0 E}{f_c R3 C2}\tau \right) \quad (3)$$

where $f_\epsilon(\pi)$ = frequency difference between the clock in the multiplexer and the VCO $\pi$ seconds after beginning of acquisition.

$\Delta f$ = initial frequency error.

$\pi$ = time measured from beginning of frequency acquisition.

$K_o$ = VCO gain constant referred to waveform $P_{1/4}$ (Hz/V).

R3 = resistor connecting the flip-flop output through switch SW3 to the active loop filter.

C2 = the capacitor in the active loop filter.

Frequency acquisition time is defined as the time required to reduce the frequency error to the fast pull-in frequency of the coarse phase lock loop. With this definition, Eq. (3) can be solved for frequency acquisition time.

$$\pi_A = (f_c R3C2/K_o E)\ ln\ (\Delta f/\Delta f_L) \quad (4)$$

where $\pi_A$ = frequency acquisition time (time required to reduce the initial frequency error, $\Delta f$, to the fast pull-in frequency of the coarse phase lock loop $\Delta f_L$)

$\Delta f_L = f_n \sqrt{2}$ = fast pull-in frequency of the coarse phase lock loop when the damping factor is 0.707

$f_n$ = undamped natural frequency of oscillation of the coarse phase lock loop

For the following parameter values, the frequency acquisition time is 175 ms for a 10 percent error in frequency:

$f_c$ = 500 Hz
$K_o$ = 47.3 Hz/V
R3 = 30 $k\Omega$
$C2$ = 1 $\mu F$
$\Delta f$ = 50 Hz
$\Delta f_L$ = 3.2 Hz This agrees well with measured values, which range from 180 ms to 200 ms.

This time cam be shortened if desired. After the frequency error is reduced to the fast pull-in frequency of the coarse phase lock loop, the additional time to phase lock is negligible compared with $\pi_A$.

INITIAL PHASE LOCK

All of the subcarrier and sub-subcarrier waveforms used for synchronization and calibration in both the multiplexer and demultiplexer are shown in FIG. 2. The relative phases for the multiplexer and demultiplexer waveforms are shown for the in-synchronization condition. The period of the lowest frequency waveform is 4T. As noted above, the system progresses through three modes of phase lock in arriving at the final lock condition. The three modes are (1) initial, (2) coarse, and (3) fine phase lock.

Figure 3:
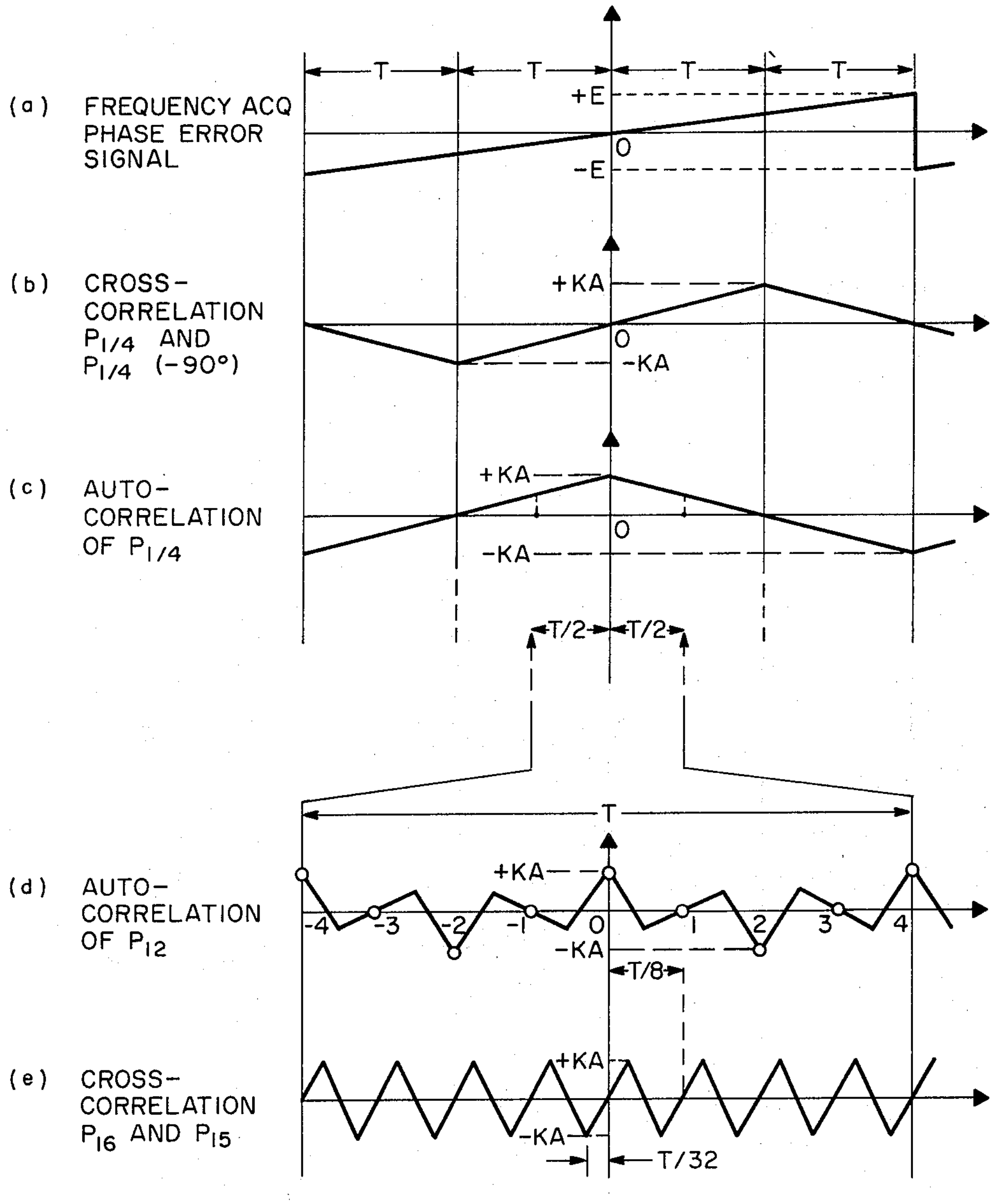
FIG. 3 shows the synchronization correlation functions.

The function of the initial phase lock mode is to reduce the phase error to less than ±T/2. (All phase errors will be measured in terms of the period T to avoid confusion with the different frequencies involved. Zero phase angle corresponds to the phase shown in FIG. 2, where the lowest frequency sub-subcarriers of the demultiplexer are brought into exact phase with those of the multiplexer.) The frequency acquisition circuitry also functions in a phase lock mode and provides a phase error signal during the initial phase lock mode. The average output voltage versus phase angle is shown in FIG. 3. The loop filter components associated with the frequency acquisition circuitry are resistors R3 and R5, and capacitor C2. Resistor R5 determines the damping factor, and resistor R3 determines the bandwidth of the phase lock mode. The phase lock loop parameters for all three phase lock loops appear in the following Table. All relationships are based on a damping factor of 0.707.

opens. The autocorrelation of waveform $P_{1/4}$ is a convenient function for detecting this condition. This function is shown in FIG. 3 at (*c*). This is the average voltage as a function of phase angle and is available from multiplier 30 at point A in FIG. 1. This signal is passed through a low pass filter (LPF) 35 to a threshold detector 37. The phase angle ±T/2 corresponds to one half TABLE OF PHASE LOCK LOOP PARAMETERS
(Damping factor = 0.707 for all phase lock loops)

| Phase lock loop | | $K_0$ (VCO gain constant), (rad/sec)/V | $K_d$ (phase detector gain constant), V/rad | $\omega_n$ (undamped natural frequency), rad/sec | $B_L$ (phase lock noise bandwidth), Hz | Damping resistance, kΩ |
|---|---|---|---|---|---|---|
| Freq. acq. phase lock loop | Functional representation | | $\frac{E}{\pi}$ | $\sqrt{\frac{K_0K_d}{R3C2}}$ | $\frac{\omega_n}{2}$ | $\frac{\sqrt{2}}{\omega_nC2}$ |
| | Numerical value | 298 | 1.59 | 125 | 62 | 11 |
| Coarse phase lock loop | Functional representation | $\frac{\pi}{2^5R_EE_4C}$ | $\frac{2KA}{\pi}$ | $\sqrt{\frac{K_0K_d}{R4C2}}$ | $\frac{\omega_n}{2}$ | $\frac{\sqrt{2}}{\omega_nC2}$ |
| | Numerical value | 298 | 0.159 | 33 | 16.5 | 43 |
| Fine phase lock loop | Functional representation | $\frac{\pi}{2R_EE4C}$ | $\frac{16KA}{\pi^3}$ | $\sqrt{\frac{K_0K_d}{R1C2}}$ | $\frac{\omega_n}{2}$ | $\frac{\sqrt{2}}{\omega C2}$ |
| | Numerical value | 9480 | 0.128 | 33 | 16.5 | 43 |

Switch SW4 is closed during the initial phase lock mode and is also supplying a phase error signal (see (*a*), FIG. 3) to error amplifier 10 of the active loop filter. This phase error signal results from the cross-correlation between waveforms $P_{1/4}$ and $P_{1/4}$ (−90°) and is shown at (*b*) in FIG. 3. The active loop filter components associated with the coarse phase lock loop are resistor R4, resistors R2 + R5, and capacitor C2. Resistor R4 determines the coarse phase lock loop bandwith, and resistors R2 + R5 determine the damping factor. Frequency phase lock loop components include flip-flop 18, resistors R3 and R5, capacitor C2, VCO 12, and waveform generator 20. Terminal 21 of waveform generator 20 is connected to terminal 25 which is connected to flip-flop 18. The frequency acquisition phase lock loop provides the dominant control during the initial phase lock mode. This is shown by the fact that although resistors R3 and R4 are comparable, the phase detector gain constant $K_d$ for the frequency acquisition phase lock loop is ten times that for the coarse phase lock loop (see the above Table).

The phase resolution accuracy of the frequency acquisition phase lock need not be great. As noted, the requirement of the initial phase lock mode is to reduce the phase error to less than ±T/2. For this reason, the phase shift through BPF 14 is not critical. The phase shift through BPF 14 will be zero when the clock is at the nominal design value. The system is designed to handle clock frequency variations of ±10 percent of the nominal value. Therefore, the phase shift through the BPF must be less than ±T/2 for these extremes of clock frequency. The actual phase shift at ±10 percent off frequency is about ±T/4.

When the phase angle between the multiplexer and the demultiplexer is reduced below ±T/2, switch SW3 of the correlation peak KA, and the threshold level is set at a level corresponding to 0.6 KA. After final phase lock is achieved, the average voltage at point A will be KA. The bandwidth of LPF 35 must be narrow enough to reduce the rms noise voltage, under worst noise conditions, to a level such that the probability of noise peaks exceeding 0.4 KA is negligible. Peaks exceeding 0.4 KA would cause false closure of switch SW3.

Multipliers 30, 31, 32 and 33 are phase demodulator type circuits from which a dc voltage is derived. Preferably FET switches are used for the multipliers. Multiplier 30 functions both as a difference frequency detector and a signal phase detector whereas multipliers 31, 32 and 33 merely operate as phase detectors.

The output waveforms $P_{1/4}$, $P_{15}$, $P_{1/4}$(−90°) and $P_{12}$ from demultiplexer waveform generator 20 are connected to multipliers 30, 31, 32 and 33 respectively (i.e., terminals 21, 22, 23 and 24 are connected to terminals 25, 26, 27 and 28, respectively). Other subcarrier waveforms associated with the telemetry data, which are used to demodulate the data, are also obtained from demultiplexer waveform generator 20.

COARSE PHASE LOCK MODE

The coarse phase lock mode is defined as the period of operation between the opening of switch SW3 and the opening of switch SW4. During this time, both the coarse phase lock loop and the fine phase lock loop are supplying phase error currents to the error amplifier 10.

The dominant error signal is provided by the coarse phase lock loop. The loop filter components associated with the fine phase lock drop are resistor R1, resistors R2 + R5, and capacitor C2. The damping resistance for both the coarse and fine phase lock loops is provided by resistors R2 + R5. The phase detector gain constant, shown in the Table, is based on the assumption that only the fundamental frequency component of waveform $P_{16}$ is present at the demultiplexer, due to the band limiting of pre-modulation and post-detection filters. For a damping factor of 0.707 for both the coarse and fine phase lock loops, the following equation must be satisfied:

$$(R1/R4) = [(K_o K_d)\ F/(K_o K_d)\ C] = 25.6 \quad (5)$$

where the subscripts F and C denote the fine and coarse phase lock loops respectively. The data is presented in the Table. The following resistor values will satisfy Eq. (5):

$$R1 = 1.1\ M\Omega$$

$$R3 = 43\ k\Omega$$

These resistors differ sufficiently in magnitude that a switch to disconnect resistor R1 from error amplifier 10 during the coarse phase lock mode of unnecessary.

The system remains in the coarse phase lock mode until the phase error is reduced below ±T/32. This corresponds to ±90° waveform of $P_{16}$, which is the condition necessary to acquire fine phase lock. The cross-correlation between waveforms $P_{1/4}$ and $P_{1/4}(-90°)$ can be used to sense this phase angle; however, the sensitivity is very low. A very narrow band LPF 34 would be required to achieve a usable signal-to-noise ratio, with very slow response times as a result. To avoid this, waveform $P_{12}$ is used to sense the in-phase condition of ±T/32. The autocorrelation of waveform $P_{12}$ is well suited to this function since it has a very sharp, isolated correlation peak at zero phase angle. The waveform $P_{12}$ autocorrelation function is shown at (*d*) in FIG. 3, and is available at point D of FIG. 1. Fine phase lock can occur only at the points indicated by small circles at (*d*) on FIG. 3. It will be seen that the correlation function at these lock points is zero or below for all phase angles less than ±T/2. To permit the use of a wider band LPF 34, with faster response time, a dual time constant RC peak detector circuit 36 is employed between LPF 34 and threshold detector 38. The dual time constant RC peak detector circuit consists of diode 41, resistor 42, and capacitor 43. Resistor 44 is a diode current limiting resistor. The RC network (resistor 42 and capacitor 43) in conjunction with diode 41 provides the "dual" time constant. The RC network provides a normal time constant when the signal is negative (−) and diode 41 is not conducting; when the signal is positive (+) diode 41 conducts and the time constant is shorter than normal. This circuit 36 permits the detection of a narrow correlation peak yet prevents noise peaks from causing false closure of switch SW4 once fine phase lock is achieved.

FINE PHASE LOCK

In fine phase lock, the only phase error supplied to error amplifier 10 arises from the cross-correlation between waveforms $P_{16}$ and $P_{15}$ which appears at (*e*) in FIG. 3. The average phase angle between the multiplexer and the demultiplexer waveforms is zero. The magnitude of the perturbations on either side of zero depends upon the amount of noise entering the demultiplexer and the noise bandwidth of the fine phase lock loop (e.g., 16.5 Hz).

There are several variations of the circuit described which will not alter the essential features of the invention. For example, a zero-crossing detector can be used to obtain fine synchronization information, and this would free subcarrier waveforms $P_{15}$ and $P_{16}$ for use as data channels. Another subcarrier waveform with correlation properties suitable for monitoring the state of the fine phase-lock-loop can be used in place of waveform $P_{12}$.

Also, a switch can be placed in series with resistor R1 which will be closed automatically when switch SW4 is opened. This will permit independent selection of resistors R1 and R4 and thus independent selection of the bandwidths and damping factors of the coarse and fine phase-lock-loops. The absence of this switch requires that resistor R1 be large as compared to resistor R4 to assure that the error signal from the coarse phase-lock-loop dominates that from the fine phase-lock-loop.

Obviously, many modifications and variations of the present invention are possible in the light of the above teachings. It is therefore to be understood that within the scope of the appended claims the invention may be practiced otherwise than as specifically described.

What is claimed is:

1. A synchronization system for synchronizing the demultiplexer of a pulse orthogonal multiplexing system in both frequency and phase with respect to the received signals from the multiplexer, comprising:

a. a system input to which signals from the multiplexer are fed;

b. a voltage controlled oscillator which is controlled in frequency and phase to provide a reference frequency to be phase locked with the multiplexer;

c. a demultiplexer waveform generator connected to the output of said voltage controlled oscillator for generating synchronization waveform signals used for phase locking with input signal waveforms from the multiplexer;

d. an active loop filter which includes loop filter portions for frequency acquisition, coarse phase-lock and fine phase-lock, respectively;

e. first, second, third and fourth multipliers, each of which derive a d.c. voltage as a function of the phase angle between the input signals from the multiplexer and respective synchronization waveform signals from the demultiplexer waveform generator;

f. frequency acquisition phase-lock circuitry which includes a first switch means operable to be connected between said system input and the input of said voltage controlled oscillator via the frequency acquisition portion of said active loop filter for controlling said oscillator upon actuation of said first switch means, said first multiplier output operating to actuate said first switch means;

g. coarse phase-lock circuitry which includes said second multiplier and a second switch means connected between said system input and the input of said voltage controlled oscillator via the coarse phase-lock portion of said active loop filter, also for controlling said oscillator and operable to be disconnected upon actuation of said second switch means; said fourth multiplier output operating to actuate said second switch means;

h. fine phase-lock circuitry which includes said third multiplier connected between said system input and the input of said voltage controlled oscillator via the fine phase-lock portion of said active loop filter also for controlling said oscillator;

i. select synchronization subcarrier waveforms from said demultiplexer waveform generator being used to actuate said first, second, third and fourth multipliers, respectively;

j. said frequency acquisition phase-lock circuitry initially acquiring the frequency of an unknown incoming signal received from the multiplexer at said system input;

k. said coarse phase-lock circuitry providing a phase-error signal to reduce phase error;

l. said fine phase-lock circuitry providing final synchronization adjustment;

m. said frequency acquisition and coarse phase-lock circuits being sequentially switched out of operation by said first and said second switch means, respectively, as each step in synchronization is achieved wherein continuous monitoring of the synchronization status and exclusion or inclusion of error signals is automatically achieved to optimize synchronization performance.

2. A system as in claim 1 wherein said frequency acquisition phase-lock circuitry includes a band pass filter, a zero crossing detector and a flip-flop circuit, respectively, connected in series, the input to said band pass filter connected to the system input and the output of said flip-flop circuit connected to said first switch means.

3. A system as in claim 1 wherein a network comprising a dual time constant RC peak detector circuit connected in series between a low pass filter and a threshold detector is used in said second switch means with said coarse phase-lock circuitry to enhance the probability of in-synchronization detection over false alarm occurrence and prevent false closure of said second switch means once fine phase lock is achieved.

* * * * *